US012729590B2

(12) United States Patent
Skillman, Jr. et al.

(10) Patent No.: US 12,729,590 B2
(45) Date of Patent: Sep. 8, 2026

(54) SYSTEM AND METHOD FOR RESPONSIVELY INJECTING CHEMISTRIES DIRECTLY INTO A DOWNHOLE SLURRY

(71) Applicants: Charles Vincent Skillman, Jr., Fort Pierce, FL (US); Frank John Christy, Bohemia, NY (US)

(72) Inventors: Charles Vincent Skillman, Jr., Fort Pierce, FL (US); Frank John Christy, Bohemia, NY (US)

(73) Assignee: Sentinel Solutions LLC, Holstville, NY (US)

( * ) Notice: Subject to any disclaimer, the term of this patent is extended or adjusted under 35 U.S.C. 154(b) by 0 days.

(21) Appl. No.: 19/074,236

(22) Filed: Mar. 7, 2025

(65) Prior Publication Data

US 2025/0369294 A1 Dec. 4, 2025

Related U.S. Application Data

(60) Provisional application No. 63/563,233, filed on Mar. 8, 2024.

(51) Int. Cl.

| | |
|---|---|
| ***E21B 21/06*** | (2006.01) |
| ***B01F 33/50*** | (2022.01) |
| ***B01F 33/81*** | (2022.01) |
| *E21B 49/00* | (2006.01) |

(52) U.S. Cl.

CPC ............ *E21B 21/062* (2013.01); *B01F 33/50* (2022.01); *B01F 33/81* (2022.01); *E21B 21/068* (2013.01); *E21B 49/00* (2013.01)

(58) Field of Classification Search

None

See application file for complete search history.

(56) References Cited

U.S. PATENT DOCUMENTS

| | | | | |
|---|---|---|---|---|
| 2,635,859 | A * | 4/1953 | Dreyfus | E21B 21/062 366/164.1 |
| 4,040,954 | A | 8/1977 | Chandler | |
| 5,093,008 | A | 3/1992 | Clifford, III | |
| 5,896,883 | A * | 4/1999 | Khalatbari | B01F 33/502 137/259 |
| 6,315,894 | B1 | 11/2001 | Wiemers | |
| 7,420,365 | B2 | 9/2008 | Witcraft et al. | |
| 7,497,954 | B2 | 3/2009 | Ivan | |
| 7,736,497 | B2 | 6/2010 | Fout | |
| 10,603,644 | B1 * | 3/2020 | Beason | B01F 25/21 |

(Continued)

FOREIGN PATENT DOCUMENTS

| | | |
|---|---|---|
| CN | 110776072 A | 2/2020 |
| CN | 111362381 A | 7/2020 |

(Continued)

*Primary Examiner* — Blake Michener

(74) *Attorney, Agent, or Firm* — The Law Office of Michael J. Scheer PC

(57) ABSTRACT

A system and method that provides an automated process for the trenchless construction marketspace. The system including a containerized unit consisting of a plurality of holding tanks, fluid agitators, hootenanny mixers, progressive cavity pumps and pneumatic valving. The operator of the system is capable of mixing costly polymer chemistries simultaneously while dosing the custom mixes into the active circulating system at a fixed rate.

20 Claims, 5 Drawing Sheets

(56) References Cited

U.S. PATENT DOCUMENTS

| | | | | |
|---|---|---|---|---|
| 11,130,686 | B2 | 9/2021 | Askelsen | |
| 2002/0108786 | A1* | 8/2002 | Rowden | E21B 21/062 175/57 |
| 2009/0277634 | A1* | 11/2009 | Case | E21B 43/267 166/275 |
| 2010/0038318 | A1 | 2/2010 | Gilmour | |
| 2010/0059453 | A1 | 3/2010 | Reardon | |
| 2010/0270221 | A1 | 10/2010 | Reardon | |
| 2010/0319921 | A1* | 12/2010 | Eia | E21B 21/062 166/305.1 |
| 2013/0242688 | A1* | 9/2013 | Kageler | B01F 27/812 366/144 |
| 2013/0292122 | A1* | 11/2013 | Nichols | B01F 35/71731 166/308.1 |
| 2015/0238914 | A1* | 8/2015 | Luharuka | B01F 23/59 366/154.1 |
| 2017/0138134 | A1* | 5/2017 | Walker | E21B 21/062 |
| 2022/0234010 | A1* | 7/2022 | Abughaban | B01F 35/2136 |
| 2023/0287778 | A1* | 9/2023 | Keilers | E21B 43/2607 |

FOREIGN PATENT DOCUMENTS

| | | | |
|---|---|---|---|
| DE | 102015103583 | A1 | 9/2016 |
| KR | 101226945 | B1 | 2/2013 |
| WO | 2021024043 | A1 | 2/2021 |

* cited by examiner

SYSTEM AND METHOD FOR RESPONSIVELY INJECTING CHEMISTRIES DIRECTLY INTO A DOWNHOLE SLURRY

FIELD OF THE INVENTION

The present invention generally relates to systems and methods for mining and drilling and more particularly to systems and methods for generating and providing a controlled slurry to assist in the mining and drilling operation.

BACKGROUND OF THE INVENTION

Prior to any drilling and mining project, an operator typically has geotechnical cores drilled in order to understand the formation characteristics through the plan and profile of the shaft to be drilled/mined. Throughout the drilling process the operator determines, in real time, what type of drilling/mining slurry chemistries are most compatible with the formation being encountered to minimize formation impact and yield the highest chances of success for shaft completion. In some cases, these drilled/mined shafts are classified as environmental crossings or marked as environmentally sensitive. Very specific and costly material feedstocks are designed for these types of crossings and are an integral part of operational and hazard contingency planning.

During the mining/drilling operation, the operator at the surface typically has one or two 1000-gallon slurry mixing tanks to generate both the head and lubrication slurries. These slurries provide cutter head lubrication and cooling, cuttings suspension and transport, and formation support and stability. The slurries are commonly a mixture of micronized commercial bentonite and freshwater at the start of the operation. As the drilling/mining progresses, the formation cuttings are typically processed out of the returned slurry with separation equipment in order to reclaim the fluid (predominantly water). Providing water to jobsites can be problematic, particularly the volume required for larger drilling projects. Thus, an important aspect of responsible, cost effective drilling is to recycle the water for reuse. Typically, a reclaimer mixes water and drilling fluid additives at the jobsite and is communicatively connected to a high-pressure mud pump for pumping the slurry downbore. Drill cuttings and dirty fluid flow back to the reclaimer to repeat the reclamation process. The separation equipment (reclaimer) is typically communicatively connected to the slurry mix tanks in order to allow for the fluid to be continuously recycled. These slurries have a very specific lifecycle and need to be treated with expensive polymers to extend the functionality of the slurries.

SUMMARY OF THE INVENTION

The Direct Injection Unit of the present invention is a fit-for-purpose system that provides a semi or fully automated process for the trenchless construction marketspace. The system preferably includes a containerized, mobile unit consisting of an input port for the supply local (city) water, a holding tank for holding a supply of the local water, at least one sweep tank, a plurality dosing tanks, fluid agitators, hootenanny mixers, progressive cavity pumps, pneumatic valving, an input port for receiving a reclaimed slurry and an output port for delivering the dosed slurry down the borehole.

One embodiment of the present invention is a system for providing chemistries to a downhole bound mud slurry in a drilling or mining operation. The system includes a mudline pipe conveying the mud slurry from an upstream source; a freshwater holding tank; a plurality of dosing tanks communicatively coupled to the freshwater holding tank, and communicatively coupled to the mudline pipe; a sweep tank communicatively coupled to the freshwater holding tank and communicatively coupled to the mudline pipe; a plurality of eductors, each of the plurality of dosing tanks and the sweep tank being communicatively coupled to the freshwater holding tank through a respective one of the plurality of eductors, each of the plurality of eductors being configured to receive a chemical, wherein the chemical and the freshwater are mixed in the eductor to create a solution; a controller, the controller controlling a flow of the solution from the plurality of dosing tanks and the sweep tank into the mudline; and a container in which all of the elements of the system are disposed.

In another embodiment, the system of the present invention for providing chemistries to a downhole bound slurry in a drilling or mining operation includes a mudline pipe; an upstream mudline port communicatively coupled to the mudline pipe, the upstream mudline port being configured to receive a mud slurry and delivering it to the mudline pipe; a downstream mudline port communicatively coupled to the mudline pipe, the downstream mudline port being configured to receive the mud slurry from the mudline pipe and delivering it downstream; a freshwater holding tank; a freshwater port communicatively coupled to the freshwater holding tank, the freshwater port being configured to receive freshwater from a local source and delivering it to the freshwater holding tank; a plurality of dosing tanks communicatively coupled to the freshwater holding tank, and communicatively coupled to the mudline pipe; a sweep tank communicatively coupled to the freshwater holding tank and communicatively coupled to the mudline pipe, wherein the volume of the sweep tank is greater than a volume of any of the plurality of dosing tanks; a plurality of eductors, each of the plurality of dosing tanks and the sweep tank being communicatively coupled to the freshwater holding tank through a respective one of the plurality of eductors, each of the plurality of eductors being configured to receive a chemical, wherein the chemical and the freshwater are mixed in the eductor to create a solution; a controller, the controller controlling a flow of the solution from the plurality of dosing tanks and the sweep tank into the mudline pipe; and a container in which all of the elements of the system are disposed.

A further embodiment of the present invention is a process for providing chemistries for downhole conditions in a drilling or mining operation. The process includes supplying freshwater to a sweep tank and a plurality of dosing tanks; mixing, in a first of the plurality of dosing tanks, at least one chemical and the freshwater to create a first solution; mixing, in a second of the plurality of dosing tanks, at least one second chemical and the freshwater to create a second solution; receiving a command to inject at least one of the two solutions; and injecting the least one solution in a mudline slurry being conveyed downhole.

The design of the present invention allows for the operator to control the mixing, (make down) of costly polymer chemistries simultaneously while dosing the custom mixes into the active circulating system at a fixed and controlled rate. With this unprecedented level of control, the operator can improve drive rates and hole conditions as well as reduce costly material overspend/waste.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
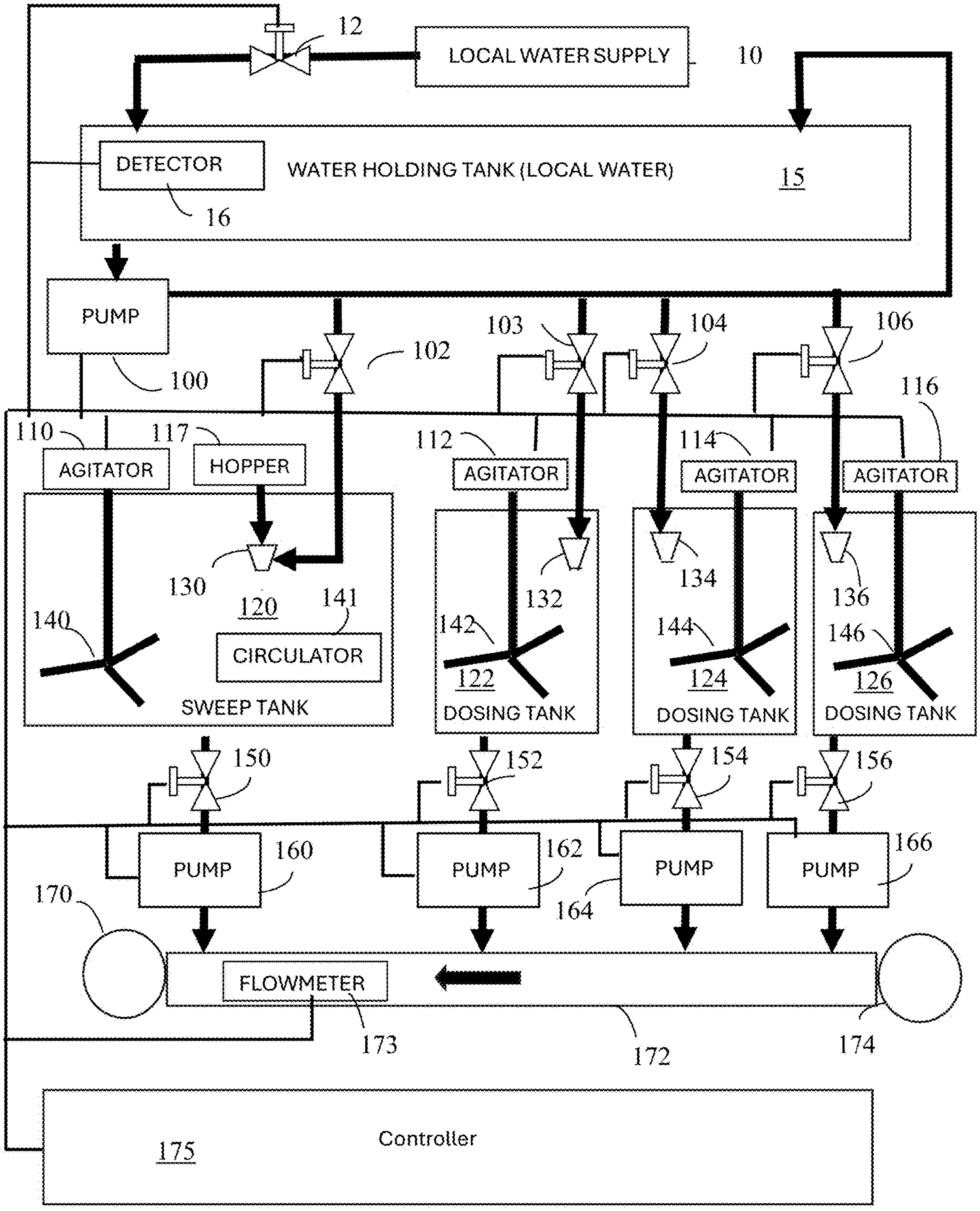
FIG. 1 depicts an overview of the system of the present invention.

Mixing polymers into a heavy solid to water ratio slurry is a difficult process. As the shafts being mined/drilled increase in length and the low gravity solids from the cuttings being processed begin to accumulate in the slurry fluid, it is necessary to begin adding water soluble polymers to the slurry being fed down the shaft. Polymers are added to the slurry to aid the drilling process and to promote the stability of the borehole. In the prior art, the polymers were typically added to the reclaimed fluid in a reclaimer. However, there is often little free water contained in the slurry after reclamation, and it is thus difficult to incorporate a dry polymer into the mixture. This is one place where the direct injection unit of the present invention proves its functionality. With a separate, isolated, dosing tanks and mixing system plumbed into the active circulating system, fresh water and soluble polymers are mixed at very specific, controlled ratios and are then added into the slurry to accompany the head and lubrication fluids.

Traditional methods of incorporating water soluble polymers into the active circulating system are predominately manual and extremely inefficient. With the isolated mixing configuration of the present invention, the operator can precisely control polymer application in a concentrated form via automated and preferably remote controls. If the drilling operator recognizes the need to increase formation stability, the operator does not have to wait to mix as in the prior art systems. Changes in formation stability occur when drilling transitions, for example, from a rock formation to a clay formation. Such changes in formations require a change in the chemistry of the mudline slurry in order to maintain a stable borehole.

The operator can detect changes in formation from observing a variety of factors in the drilling including pressures, differential pressures, torque, jacking, thrusting and rate of penetration. Although most of these indicators are detected using analog means, the analog quantity can be converted to digital. Once converted to digital, the digital signals can be processed and analyzed in order to alert the operator to a change in formation. This alert/analysis can additionally be determined by or forwarded to the controller of the direct injection unit of the present invention in order to automatically modify the chemistry being added to the mud slurry being pumped down the shaft.

In many cases, a quick response to changes in formation determines success versus failure in the drilling of the shaft. The enhanced mixing capabilities of the system and process of the present invention provides this quick response, not capable of being achieved with the prior art systems.

Loss of circulation or inadvertent returns in an environmentally restrictive area can be costly. Whether the fracture is naturally occurring and propagated through annular pressure increases in the shaft or created due to annular pressure surges due to poor hole cleaning characteristics, a quick response to seal the hole in the shaft is imperative. Losing a shaft or channeling into a watershed can be the meaning between success and failure of a project. The direct injection unit of the present invention allows for this quick response, unheard of in the prior art systems.

The system of the present invention described herein is a low footprint chemical dosing system, designed to constantly inject metered doses to a live mud system. The constant/consistent/controlled dosing eliminates the overdosing and underdosing of the system, thus maintaining the mud at its highest quality. It is a known fact that high quality mud delivers the best drilling results possible and poor mud creates most of the drillers' unwanted problems.

As shown in at least FIG. 1, the system of the present invention uses a local water supply (e.g., city water) 10 to supply fresh water to the system. Alternatively, the freshwater can be fed from freshwater storage tanks onsite. The fresh water from the local water supply 10 is fed to a self-leveling regulating holding tank 15 in the containerize mobile unit (see FIGS. 2-4) which houses the system. A control valve 12 regulates the feed of fresh water from the local supply 10 to the holding tank 15. A detector 16 detects the water level in the tank 15 and causes the shut off valve 12 to stop the feed from the local water supply 10 when the water has reached a predetermined level, e.g., full. Similar level detectors 16 are disposed in each of the tanks of the present system to detect the fluid level in that tank, but have not been shown for the purposes of clarity of the drawing. In a preferred embodiment the detectors 16 are comprised of two redundant floats in each tank to ensure there is no overfill of any tank. As further described below, fresh water in the holding tank 15 is used for make down (mixing) of chemicals that are to be dosed into the mud slurry.

Pump 100 is used to pump the fresh water from holding tank 15 to the various mixing/dosing tanks 120-126. The system allows the operator to preset and control the water pressure to mixing/dosing tanks 120-126 via pump 100 and valves 102-106. This water pressure control provides the operator with a fine-tuning ability to tailor the mixing characteristics of the eductors 130-136 to the particular chemical being mixed/used in a particular tank 120-126. Eductors 130-136, also known colloquially as hootenannies, operate on the well-known Venturi effect in which a reduction in fluid pressure occurs in moving fluid that speeds up as it flows from one section of a pipe to a smaller section. This Venturi effect in Eductors 130-136 provides for excellent mixing of the polymers employed in the present system. Problems occur if the pressure from holding tank 15 into the eductors 130-136 is too high and the dosing tank 120-126 is full before the chemical dose is fully input. Alternatively, if the pressure from holding tank 15 is too low, there is insufficient mix quality in the eductors 130-136. The pressure into the eductors 130-136 can be controlled by the combination of the pump 100 and valves 102-106.

The mixing of the chemicals in the system of the present invention can be manual, semi-automatic or fully automated. This stage in the process preferably controls the water fill level in tanks 120-126 automatically. The system also preferably incorporates a calculator that determines, for a particular desired chemistry, the exact quantity of chemical needed for refill or just a top off of the current tank levels 120-126. The calculator performs this determination knowing the particular chemistry desired/input by the operator and the volume of water/fluid in the particular tank (obtained from level detector 16). In a manual embodiment, after the amount of a particular chemical, either wet or dry is determined by the calculator, the operator manually weighs (measures) out the determined amount of the chemical and adds the calculated amount of chemical to the eductor 130-136 servicing the particular dosing tank 120-126. If properly followed, the system maintains the percentages and keeps track of the total amount of chemicals used in each tank 120-126.

Figure 5:
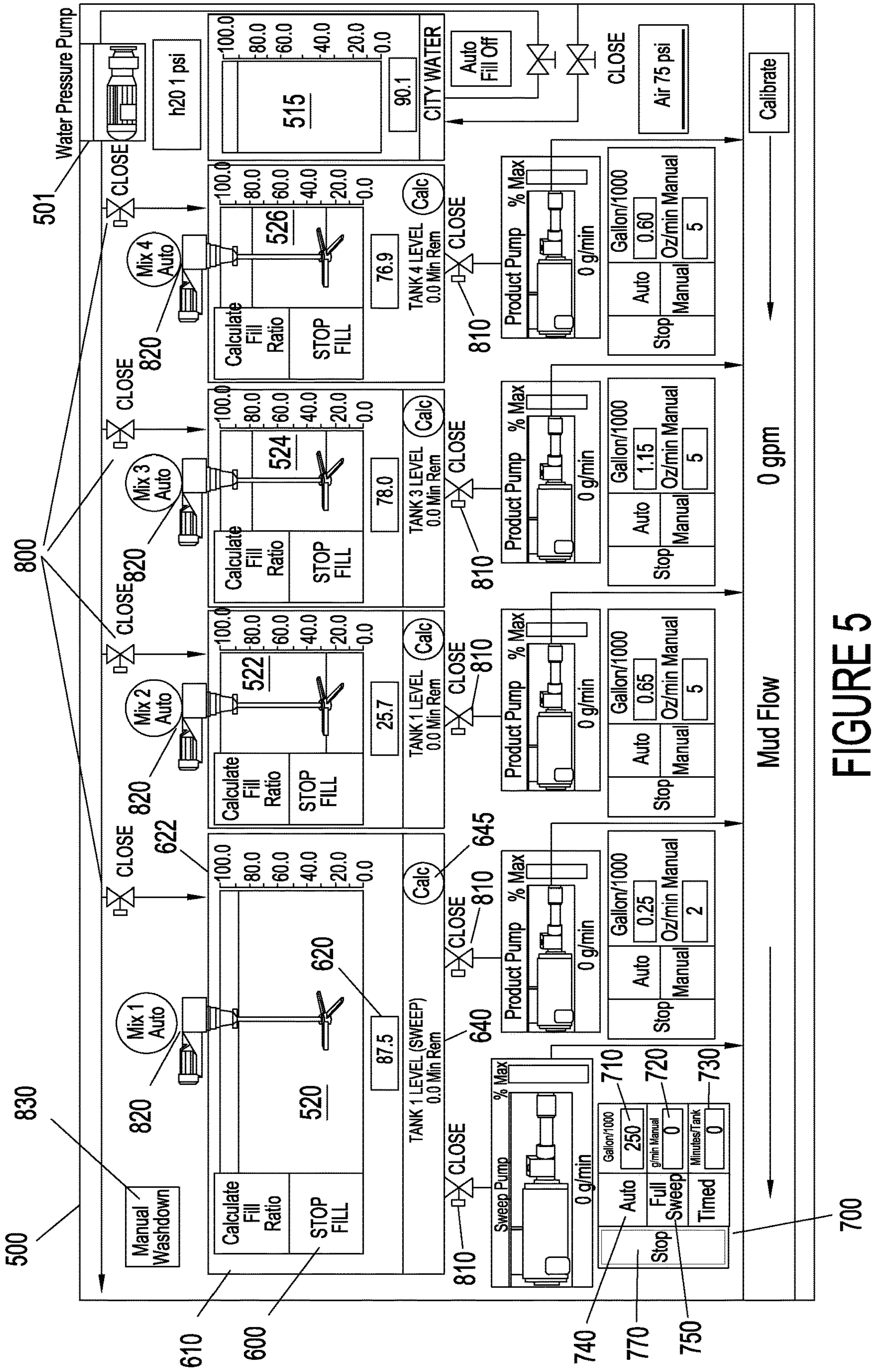
FIG. 5 illustrates a control screen of the controller according to the present invention.

In a semi-automated embodiment, the operator weighs (measures) the desired amount of chemicals for the determined chemical to water ratio and adds them to an automated feeder such as a hopper 117, which feeds the chemicals into the eductors 130-136. In a fully automated embodiment, the hopper 117 automatically weighs/measures the chemical and automatically adds the proper amount of chemicals to the eductors 130-136. Again, this automated weighing/measuring and feed into the eductors 130-136 can be accomplished by a more advanced version of the hopper 117. Like a soda dispensing machine at a fast food restaurant, the hopper precisely knows the amount of chemicals it is adding to the eductors 130-136. In one embodiment, the hopper 117 is set up with an attachment that creates a vacuum. The vacuum is connected to the hopper 117. The hopper 117 mounting includes load cells for weighing the hopper 117 and the chemicals therein. As the weight of the hopper is constant, the differential in weight indicates how much chemical product is in hopper 117. The hopper 117 has a screw drive that is electronically driven by the controller 175 based on the inputs made by the operator via touch button on the control panel 500 (see FIG. 5). The concentration desired over time is specified and the screw drive in the hopper 117 speeds up or slows down to adjust the amount of chemical being added. As described above, the hopper 117 can only dispense one chemical at a time. Although the hopper 117 is illustrated in connection with the sweep tank 120, those skilled in the art appreciate that this hopper 117 can be used with any of the dosing tanks 122-126.

Figure 2:
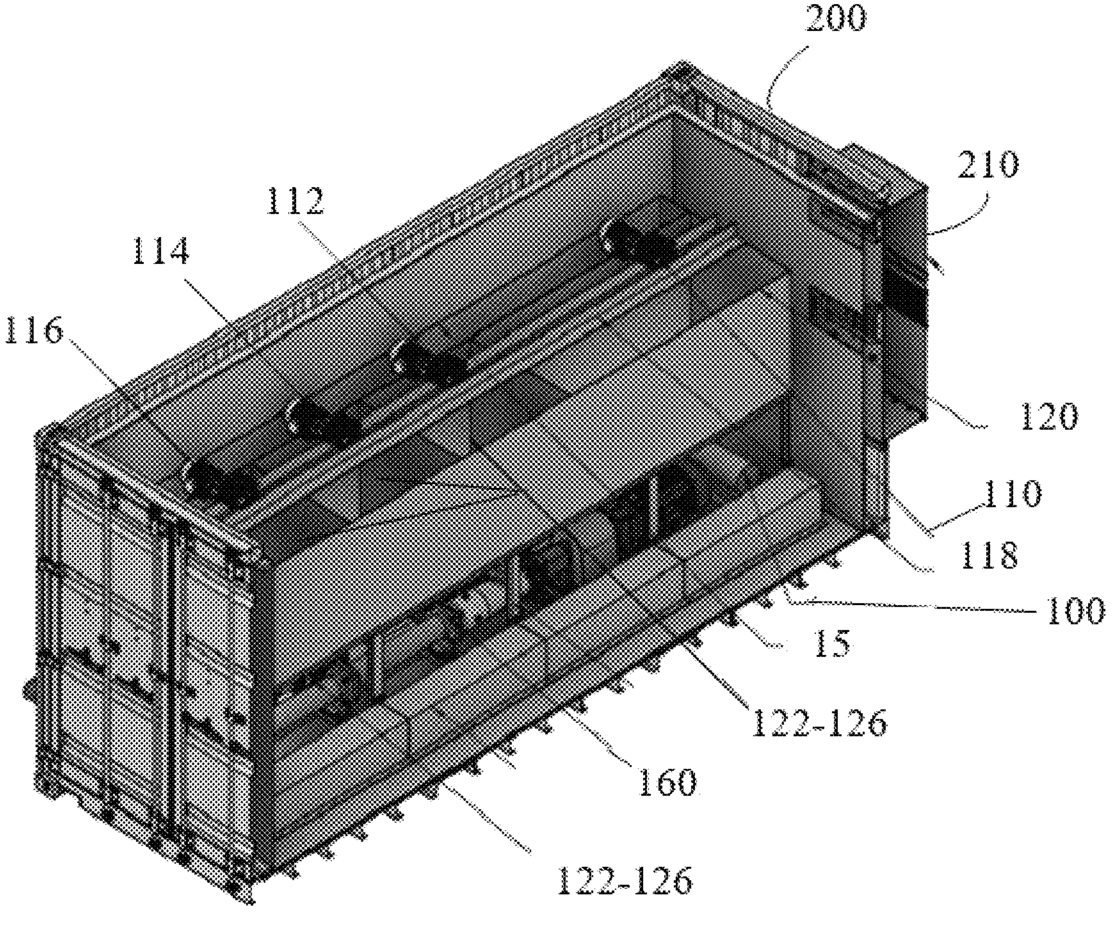
FIG. 2 is a perspective, cross sectional view of the integral tanks and mixing units of the system, installed in a mobile container unit.

The chemicals are thoroughly mixed first in the eductors 130-136 and then continuously mixed in dosing tanks 120-126 using heavy duty paddle agitators 110/140, 112/142, 114/144 and 116/146. The paddles 140-146 are driven by a shaft from agitator motors 110-116. As shown in FIG. 2, the agitator motors 110-116 are preferably mounted on a rail 118 above the various tanks 120-126. Although the paddle agitators do a fine job of maintaining the mixture of the chemicals in the water tanks 120-126, in larger tanks, such as the sweep tank 120 it is sometimes preferable to additionally include a circulator 141 to further keep the solution in the tank moving and the mixture of the dosing fluid consistent throughout the tank. Depending on the particular job, a batch of the mixture in the tank can last several hours, sometimes as long as 12 hours. As appreciated by those skilled in the art, the chemicals can precipitate out of the solution over such a long period of time.

After the chemicals have been made down (mixed) in tanks 120-126, they are injected directly into the live mudline 172 headed down hole. The injection of the slurry from tanks 120-126 into mudline 172 is automatically controlled during times of mud flow. The controller 175 affects this control by acting on the valves 150-156 and pumps 160-166. The volume of the flow from tanks 120-126 into the mud line pipe 172 is controlled to be at least sufficient to overcome the volume flowing in the pipe 172. The four injection pumps 160-166 are typically operated at high pressure so that they can overcome the line pressure of the mud system in pipe 172. If the pressure from the pumps 160-166 is insufficient, backflow of mud could occur into pumps 160-166. The volume/pressure of the mud flow in pipe 172 is measured by flow meter 173.

In one embodiment of the present invention, the controlled feed of make down chemicals from tanks 120-126 is based on the ratio of throughput or based on oz/min dosage rate. Current flow rates are calculated in real-time, and the controller 175 provides the operator with indications of the flow rate of the chemicals, the percentage of max flow of the dosing pumps 160-166 and the calculated time remaining of the current tank level. In a preferred embodiment, each of the tanks 120-126 contain different chemicals and or different mixtures to provide the operator with a wide range of options for controlling the nature of the slurry being fed down hole. For example, one tank 120-126 can contain a lubrication chemical, another an encapsulation infiltration chemical and another can contain chemicals for stabilizing the borehole.

The sweep tank 120 preferably has specialized uses on a jobsite. Use of the sweep tank 120 enables the operator to inject a large volume of treated mud in a short amount of time for a specific purpose such as unclogging the hole. The sweep tank 120 can also be used if there is a loss of circulation in the material. To accomplish these specialized operations, the pump 160 is typically a larger pump than the typical dosing pumps 162-166 for feeding the dosing material from dosing tanks 122-126 into the live mud line 172.

The pump 160 for the sweep tank 120 is preferably a progressive cavity (PC) pump capable of 150 gallons per minute (gpm) and has a max pressure of 250 pounds per square inch (psi). Using this pump 160 it is possible to dose the entire 450-gallon tank 120 in three minutes. Typically, the sweep tank 120 is used during problem times such as frack out or loss of circulation by having a premixed dose ready on standby. The sweep tank 120 can also be used for hole cleanout at the end of day to prevent plugging/clogging during periods of rest.

The system includes an automatic pump protection feature. In order to prevent a pump 160-166 from burning out due to running dry, the sensors 16 in each of the tanks 120-126 detects a low level setpoint in the tank 120-126 and the controller closes the corresponding output valve 150-156, and the pump 160-166 is shut down for its respective tank 120-126.

Figure 3:
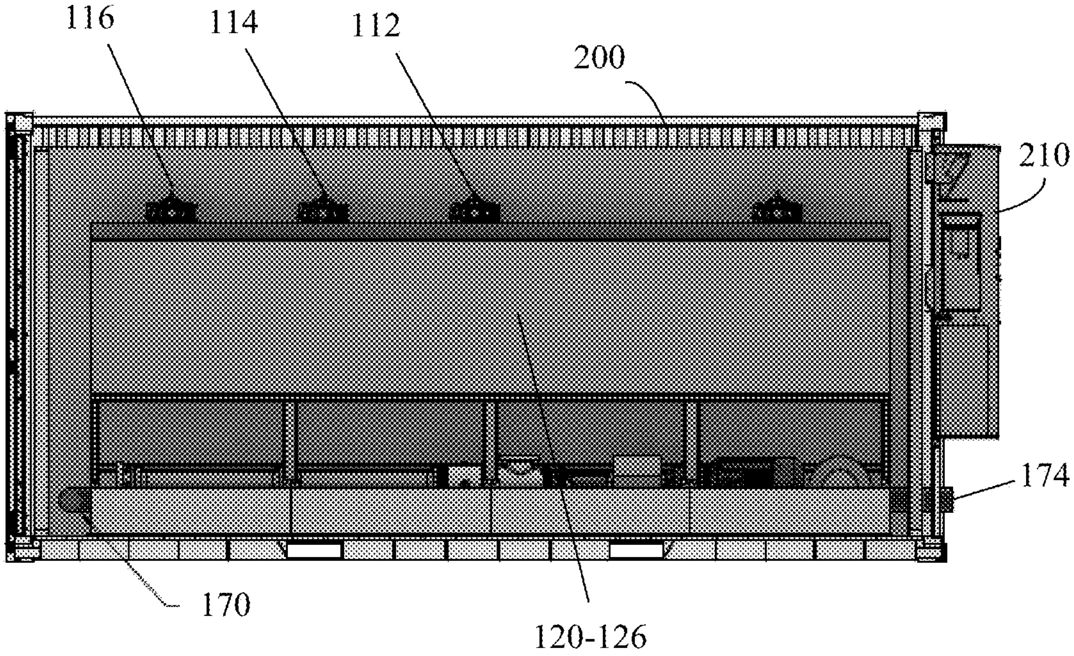
FIG. 3 illustrates a side view cross section of the integral tanks and mixing units of the system, installed in the mobile container unit.
Figure 4:
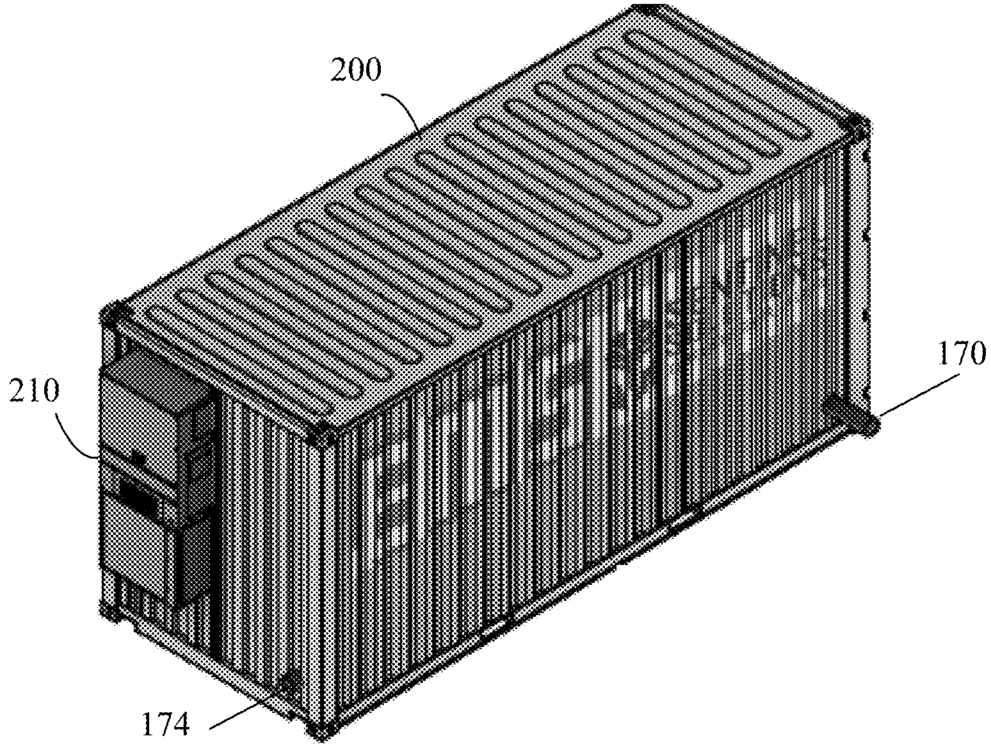
FIG. 4 depicts a perspective view of the mobile container unit.

As shown in FIGS. 2-4 the system is preferably enclosed in a container 200, typically 20 feet long. The container 200 allows ease of transportation, e.g., on a trailer, and simplicity of setup. The setup for the system is simple—connecting the mud line, connecting a water supply hose to the local water supply 10 and connecting to an electric service. The container 200 preferable includes climate control, heating and air conditioning 210 as the system can be deployed in various harsh environments. Lighting and 110 volt outlets are preferably installed in the container for convenience.

As shown in FIG. 2, all of the elements illustrated in FIG. 1 and described above are contained in the portable container 200. As illustrated in this FIG. 2, the agitator motors 110-116 are mounted on a rail 118 within the container 200 above their respective tanks 120-126. As appreciated by those skilled in the art, the system of the present invention is scalable, both up and down. In the configuration described herein, there is one sweep tank 120 and three dosing tanks 122-126. The system can be configured with one or two sweep tanks and one to five (for example) dosing tanks.

Some of the constraints on scalability are the size of the container 200 and the metering requirements for the dosing tanks—i.e., the tanks cannot be too small that they would run out of fluid too quickly.

As illustrated in FIG. 3, the two ports 170 and 174 for the live mudline are positioned, essentially, on opposite sides of the container 200. Although the flow of mud through pipe 172 in FIG. 1 is illustrated as flowing from port 174 to port 170, the flow can also be plumbed such that the input port from the reclaimer with fresh mud is connected to port 170 and port 174 is connected to the pipe going down bore (i.e., the opposite direction of the flow illustrated in FIG. 1). This capability allows the container 200 to be positioned on the site in a way that is most convenient for the operator.

The system is capable of being remotely operated and controlled by a control device connected to the controller 175. In a preferred embodiment, the control device is connected to the controller wirelessly. Using a tablet or phone as the control device connected to Wi-Fi or cellular a cellular network, the control panel 500 for the system illustrated in FIG. 5 can be conveniently provided in the driller's compartment on the tablet, phone or computer screen via a Wi-Fi, Bluetooth or cellular connection as described above. The control panel 500 can be set in a view only mode or full control can be enabled. By giving control of the present system to the driller, she can see the direct effects of the chemicals and adjust as needed.

The control panel 500 includes a virtual representation of each of the mechanical elements of the present invention illustrated in FIG. 1. Specifically, control panel 500 includes a representation 520 of the sweep tank 120 illustrated in FIG. 1, as well as representations 522-526 of the dosing tanks 122-126 illustrated in FIG. 1. The following description made with respect to the control 520 of the sweep tank is equally applicable to the controls 522-526 for the dosing tanks. Control button 600 is used to adds water to tank 120 (FIG. 1) for mixing with the chemicals as described above. When control 600 is activated, it opens valve 102 (FIG. 1) to enable water to flow from the holding tank 15 into the sweep tank 120 (FIG. 1). While the water is flowing into tank 120 (FIG. 1) the operator can activate control 600 close the valve 102 (FIG. 1) and stop the flow of water.

The Calculate fill ratio button 610 allows for specified number of gallons to fill tank 120 (FIG. 1). For example, if the operator only wants tank 120 (FIG. 1) to be half full, the operator would input 50% fill. The tank levels are continuously monitored and control panel 500 indicates to the operator how many gallons are present at any given moment. The indicator 620 informs the operator of the percentage of the tank that is filled. The scale 622 on the side also provides a numerical indication of the percentage full. The shaded area in the control 520 visually informs the operator of the approximate level of solution in tank 120 (FIG. 1).

The tank level and the dosing rate into the manifold 172 (FIG. 1) determines how much time remains until a refill of tank 120 (FIG. 1) is required. This time is calculated by the controller 175 and displayed to the user in area 640 This information is something that is very important for remote monitoring. The system allows the operator to set alarms for when it is time to manage fluid mixing. It is a 'set it and forget it' process. The CALC button 645 is activated to send operator into the dosing screen 700. Once settings are input in dosing button function, that button changes to On/off button for pumps. This is a check and balance mechanism that forces the operator to input how much they added and what dose rate they want to utilize.

Control area 700 allows the operator to control the dosing rate into the manifold 172 (FIG. 1). On the right side of control area 700 is a button labeled "gallons per 1000 gallons." In area 710 the operator is able to input how much dry or liquid product was added to tank 120 (FIG. 1) prior to or during fill up process. This is a manual input measured in pounds or gallons. The operator also has the option of manually inputting the dose rate independent of the product concentrations added. This same secondary screen in area 720 allows the operator to set the dosing at a rate of gallons per minute as manually input by the operator. In area 730, the operator can set how many minutes she wants of all of the solution in tank 120 (FIG. 1) injected into manifold 172 (FIG. 1). Activating the "Timed" button 780 enables this function. Activating the "Auto" button 740 causes the system follow the program for dosing. The "Full Sweep" button 750 sends a full sweep of the mixed product in tank 120 (FIG. 1) as fast as the pumps are designed. This is an important design aspect for immediate response to changing hole conditions. Thus, the control system of the present invention is incredibly versatile in that allows the operator to inject dosing solution either by concentration or by time. Button 770 enables a manual hard stop for the injection process.

Control 515 corresponds to the holding tank 15 illustrated in FIG. 1 for holding the fresh water supply (city water). As with the other tanks, control area 515 visually displays to the user the percentage of the tank 15 (FIG. 1) that is filled. Control 501 corresponds to pump 100 (FIG. 1) that pumps water from holding tank 15 (FIG. 1) into the sweep tank and dosing tanks 120-126 (FIG. 1). Area 502 indicates to the operator the water pressure through pump 100 (FIG. 1). Controls 800 correspond to the valves 102-106 (FIG. 1) the commutatively couple the water from the holding tank 15 (FIG. 1) into the sweep and dosing tanks 120-126 (FIG. 1). Activating the controls 800, the operator can manually open and close these valves. Similarly valves 810 correspond to the valves 150-156 that commutatively couple sweep and dosing tanks 120-126 (FIG. 1) to pumps 160-166 (FIG. 1) that feed the dosed solution into the manifold 172 (FIG. 1). Controls 820 correspond to the agitators 110-116 (FIG. 1). Activating these controls 820 allows the operator to turn the agitators 110-116 (FIG. 1) on or off. The Manual Washdown button 830 activates a function of engaging the onboard pumps to circulate freshwater. This function is utilized to washdown the tanks, and the internal compartments as well as the container 500 itself. This is a cleaning function used periodically throughout a job, typically at the end of the day.

As understood by those skilled in the art, controller 175 can include any processing circuitry, processor or processor operative to control the operations and performance of the system. For example, controller 175 can be used to run operating system applications, firmware applications, or any other application. Controller 175 can drive the control panel 550 on the control device, e.g., tablet as described above. Controller 175 includes one or more storage mediums including a hard-drive, solid state drive, flash memory, permanent memory such as ROM, any other suitable type of storage component, or any combination thereof. Controller 175 further includes memory such cache memory, semi-permanent memory such as RAM, and/or one or more different types of memory used for temporarily storing data. In some embodiments, the memory and the storage can be combined as a single storage medium. Controller 175 further includes input/output (I/O) circuitry that can be operative to convert, and encode/decode, if necessary analog signals and other signals into digital data. In some embodiments, I/O circuitry can also convert digital data into any other type of signal, and vice versa. The digital data can be provided to and received from control circuitry, storage, and memory, or any other component of controller 175. The I/O circuitry can be used to communicate with and thus control the various equipment of the system of the present invention including the valves, pumps, hoppers, circulators, detectors and agitators.

The benefits of the present system over traditional systems includes: reduction of wasted chemicals; constant quality of mud; better rate of penetration; quick reaction during frack out or loss of circulation; frees up manpower; puts control in operators hands; improved slurry rheology profile with less material consumed; effective shaft cleanouts via pumping concentrated polymer and water; Operator has more control for hazard response or hole condition changes; and reduced jacking/drilling pressures which are critical for shaft integrity and drive rates.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

What is claimed is:

1. A system for providing chemistries to a downhole bound mud slurry in a drilling or mining operation comprising:

a mudline pipe conveying the mud slurry from an upstream source;

a freshwater holding tank;

a plurality of dosing tanks communicatively coupled to the freshwater holding tank, and communicatively coupled to the mudline pipe;

a sweep tank communicatively coupled to the freshwater holding tank and communicatively coupled to the mudline pipe;

a plurality of eductors, each of the plurality of dosing tanks and the sweep tank being communicatively coupled to the freshwater holding tank through a respective one of the plurality of eductors, each of the plurality of eductors being configured to receive a chemical, wherein the chemical and the freshwater are mixed in the eductor to create a solution;

a controller, the controller controlling a flow of the solution from the plurality of dosing tanks and the sweep tank into the mudline; and a container in which all of the elements of the system are disposed.

2. The system according to claim 1 further comprising:

an upstream mudline port communicatively coupled to the mudline pipe, the upstream mudline port configured to receive the mud slurry and delivering it to the mudline pipe;

a downstream mudline port communicatively coupled to the mudline pipe, the downstream mudline port configured to receive the mud slurry from the mudline pipe and delivering it downstream;

wherein the upstream mudline port and the downstream mudline port are formed in an exterior wall of the container.

3. The system according to claim 1 further comprising:

a freshwater port communicatively coupled to the freshwater holding tank, the freshwater port configured to receive freshwater from a local source and delivering it to the freshwater holding tank.

4. The system according to claim 1 further comprising:

a hopper coupled to at least one of the eductors, the hopper receiving and holding the chemical and dispensing it to the at least one eductor.

5. The system according to claim 4, wherein the hopper is coupled to the controller and dispenses the chemical to the at least one eductor under control of the controller.

6. The system according to claim 5, further comprising a plurality of hoppers respectively coupled to respective eductors, wherein each of the plurality of hoppers is controlled by the controller to create different solutions in the plurality of dosing tanks.

7. The system according to claim 6 wherein the plurality of hoppers provide different concentrations of the chemical to the freshwater.

8. The system according to claim 6 wherein respective hoppers are configured to provide different chemicals.

9. The system according to claim 1 further comprising:

a plurality of agitators, a respective one of the plurality of agitators being disposed in a respective one of the sweep and the plurality of dosing tanks, wherein the plurality of agitators are connected to and controlled by the controller.

10. The system according to claim 1 wherein the container is mobile and can be delivered to a job site.

11. The system as recited in claim 1 further comprising:

a control device wirelessly connected to the controller, wherein the control device enable remote control of the system via the controller.

12. A system for providing chemistries to a downhole bound slurry in a drilling or mining operation comprising:

a mudline pipe;

an upstream mudline port communicatively coupled to the mudline pipe, the upstream mudline port being configured to receive a mud slurry and delivering it to the mudline pipe;

a downstream mudline port communicatively coupled to the mudline pipe, the downstream mudline port being configured to receive the mud slurry from the mudline pipe and delivering it downstream;

a freshwater holding tank;

a freshwater port communicatively coupled to the freshwater holding tank, the freshwater port being configured to receive freshwater from a local source and delivering it to the freshwater holding tank;

a plurality of dosing tanks communicatively coupled to the freshwater holding tank, and communicatively coupled to the mudline pipe;

a sweep tank communicatively coupled to the freshwater holding tank and communicatively coupled to the mudline pipe, wherein the volume of the sweep tank is greater than a volume of any of the plurality of dosing tanks;

a plurality of eductors, each of the plurality of dosing tanks and the sweep tank being communicatively coupled to the freshwater holding tank through a respective one of the plurality of eductors, each of the plurality of eductors being configured to receive a chemical, wherein the chemical and the freshwater are mixed in the eductor to create a solution;

a controller, the controller controlling a flow of the solution from the plurality of dosing tanks and the sweep tank into the mudline pipe; and a container in which all of the elements of the system are disposed.

13. The system as recited in claim 12 further comprising:

a freshwater pump communicatively coupled to the freshwater holding tank; and a plurality of freshwater valves, a respective one of the plurality of freshwater valves being disposed between the freshwater pump and a respective one of the sweep and the plurality of dosing tanks, wherein the freshwater pump and the freshwater valves are connected to and controlled by the controller to control a flow of freshwater from the freshwater holding tank to the sweep tank and the plurality of dosing tanks.

14. The system as recited in claim 12 further comprising:

a plurality of agitators, a respective one of the plurality of agitators being disposed in a respective one of the sweep and the plurality of dosing tanks, wherein the plurality of agitators are connected to and controlled by the controller.

15. The system as recited in claim 14 further comprising:

a circulator disposed in a least one of the sweep tank and the plurality of dosing tanks, the circulator providing circulation of the solution.

16. The system as recited in claim 12 further comprising:

a plurality dosing valves, a respective one of the plurality of dosing valves being communicatively coupled to a respective one of the sweep and the plurality of dosing tanks; and a plurality of dosing pumps, a respective one of the plurality of dosing pumps being communicatively coupled to a respective one of the dosing valves and communicatively coupled to the mudline pipe, wherein plurality dosing valves and the plurality dosing pumps connected to and controlled by the controller to control the flow of the mixed chemicals and freshwater from the plurality of dosing tanks and the sweep tank into the mudline.

17. The system as recited in claim 12 further comprising:

a control device wirelessly connected to the controller, wherein the control device enable remote control of the system via the controller.

18. A process for providing chemistries for downhole conditions in a drilling or mining operation comprising:

supplying freshwater to a sweep tank and a plurality of dosing tanks, the sweep tank and the plurality of dosing tanks being disposed in a single mobile container;

mixing, in a first dosing tank, at least one chemical and the freshwater to create a first solution;

mixing, in a second dosing tank, at least one second chemical and the freshwater to create a second solution;

receiving a command to inject at least one of the two solutions; and injecting the least one solution in a mudline slurry being conveyed downhole.

19. The process as recited in claim 18 further comprising:

monitoring the downhole conditions; and determining a required solution on the basis of the monitored conditions; and generating the command to inject at least one of the two solutions based on the determination.

20. The process as recited in claim 18 further comprising:

receiving parameters from an operator for the first solution;

wherein the mixing step further comprises providing measured amounts of the at least one chemical and the freshwater to an eductor; and providing the first solution to the first dosing tank.

* * * * *